US012080050B2

United States Patent
Kucher et al.

(10) Patent No.: US 12,080,050 B2
(45) Date of Patent: Sep. 3, 2024

(54) MACHINE LEARNING USING A GLOBAL TEXTURE CHARACTERISTIC FOR SEMICONDUCTOR-BASED APPLICATIONS

(71) Applicant: KLA Corporation, Milpitas, CA (US)

(72) Inventors: David Kucher, Ann Arbor, MI (US);
Sophie Salomon, Ann Arbor, MI (US);
Vijay Ramachandran, Sunnyvale, CA (US)

(73) Assignee: KLA Corp., Milpitas, CA (US)

( * ) Notice: Subject to any disclaimer, the term of this patent is extended or adjusted under 35 U.S.C. 154(b) by 435 days.

(21) Appl. No.: 17/557,014

(22) Filed: Dec. 20, 2021

(65) Prior Publication Data
US 2023/0196732 A1 Jun. 22, 2023

(51) Int. Cl.
| | |
|---|---|
| *G06V 10/77* | (2022.01) |
| *G06N 3/063* | (2023.01) |
| *G06T 5/50* | (2006.01) |
| *G06T 7/194* | (2017.01) |
| *G06T 7/73* | (2017.01) |

(Continued)

(52) U.S. Cl.
CPC ......... *G06V 10/7715* (2022.01); *G06N 3/063* (2013.01); *G06T 5/50* (2013.01); *G06T 7/194* (2017.01); *G06T 7/73* (2017.01); *G06V 10/54* (2022.01); *G06V 10/82* (2022.01); *G06T 2207/20084* (2013.01); *G06T 2207/30148* (2013.01)

(58) Field of Classification Search
CPC ... G06T 7/40; G06T 7/73; G06T 2207/30108; G06T 2207/30148; G06T 7/0002; G06T 7/0006; G06V 10/54; G06V 2201/06; G06V 10/82; G06N 3/0464; G06N 3/09
See application file for complete search history.

(56) References Cited

U.S. PATENT DOCUMENTS

| | | | |
|---|---|---|---|
| 8,126,255 B2 | 2/2012 | Bhaskar et al. | |
| 8,664,594 B1 | 4/2014 | Jiang et al. | |

(Continued)

OTHER PUBLICATIONS

Gatys et al., "Texture Synthesis Using Convolutional Neural Networks," Advances in neural information processing systems, 28, 262-270, May 2015.

(Continued)

*Primary Examiner* — Molly Wilburn
(74) *Attorney, Agent, or Firm* — Ann Marie Mewherter

(57) ABSTRACT

Methods and systems for determining information for a specimen are provided. One system includes a computer subsystem configured for determining a global texture characteristic of an image of a specimen and one or more local characteristics of a localized area in the image. The system also includes one or more components executed by the computer subsystem. The component(s) include a machine learning model configured for determining information for the specimen based on the global texture characteristic and the one or more local characteristics. The computer subsystem is also configured for generating results including the determined information. The methods and systems may be used for metrology (in which the determined information includes one or more characteristics of a structure formed on the specimen) or inspection (in which the determined information includes a classification of a defect detected on the specimen).

27 Claims, 4 Drawing Sheets

(51) Int. Cl.
*G06V 10/54* (2022.01)
*G06V 10/82* (2022.01)

(56) References Cited

U.S. PATENT DOCUMENTS

| | | |
|---|---|---|
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |
| 9,816,939 B2 | 11/2017 | Duffy et al. |
| 2018/0373986 A1 | 12/2018 | Rainwater |
| 2019/0303717 A1* | 10/2019 | Bhaskar ................ G06F 18/214 |
| 2019/0362518 A1* | 11/2019 | Croxford ................ G06N 3/04 |
| 2020/0265272 A1 | 8/2020 | Zhang et al. |
| 2021/0209418 A1 | 7/2021 | Badanes et al. |
| 2021/0312211 A1 | 10/2021 | Ma et al. |
| 2022/0327364 A1* | 10/2022 | Hunsche ................ G03F 1/36 |
| 2023/0260276 A1* | 8/2023 | Bokshi-Drotar ....... G06V 10/26 382/156 |

OTHER PUBLICATIONS

Portilla et al., "A Parametric Texture Model Based on Joint Statistics of Complex Wavelet Coefficients," International Journal of Computer Vision, 40(1), 49-71, Jun. 2000.
International Search Report for PCT/US2022/049178 mailed Mar. 24, 2023.

* cited by examiner

MACHINE LEARNING USING A GLOBAL TEXTURE CHARACTERISTIC FOR SEMICONDUCTOR-BASED APPLICATIONS

BACKGROUND OF THE INVENTION

1. Field of the Invention

The present invention generally relates to methods and systems for determining information for a specimen. Certain embodiments relate to using a global texture characteristic for classifying defects detected on semiconductor-related specimens and/or predicting one or more characteristics of a structure on semiconductor-related specimens.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Advances in deep learning have made deep learning an attractive framework for use in classification. Some currently used approaches for using deep learning frameworks for classification involve training a neural network on just principal components (local patterns), without texture features (globalized signal). While such methods may be best at capturing local features of images, they also fail to account for global patterns such as textures. By focusing almost exclusively on the patterns at localized regions, the currently used methods are ignoring other vital signals that, as the inventors have discovered and describe further herein, can improve classification performance.

Accordingly, it would be advantageous to develop systems and methods for determining information for a specimen that do not have one or more of the disadvantages described above.

SUMMARY OF THE INVENTION

The following description of various embodiments is not to be construed in any way as limiting the subject matter of the appended claims.

One embodiment relates to a system configured to determine information for a specimen. The system includes a computer subsystem configured for determining a global texture characteristic of an image of a specimen and one or more local characteristics of a localized area in the image. The system also includes one or more components executed by the computer subsystem that include a machine learning model configured for determining information for the specimen based on the global texture characteristic and the one or more local characteristics. The computer subsystem is also configured for generating results including the determined information. The system may be further configured as described herein.

Another embodiment relates to a computer-implemented method for determining information for a specimen. The method includes determining a global texture characteristic of an image of a specimen and one or more local characteristics of a localized area in the image. The method also includes determining information for the specimen by inputting the global texture characteristic and the one or more local characteristics into a machine learning model included in one or more components executed by a computer subsystem. In addition, the method includes generating results including the determined information. The determining the global texture characteristic and the one or more local characteristics step and the inputting, and generating steps are performed by the computer subsystem. Each of the steps of the method described above may be performed as described further herein. The embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
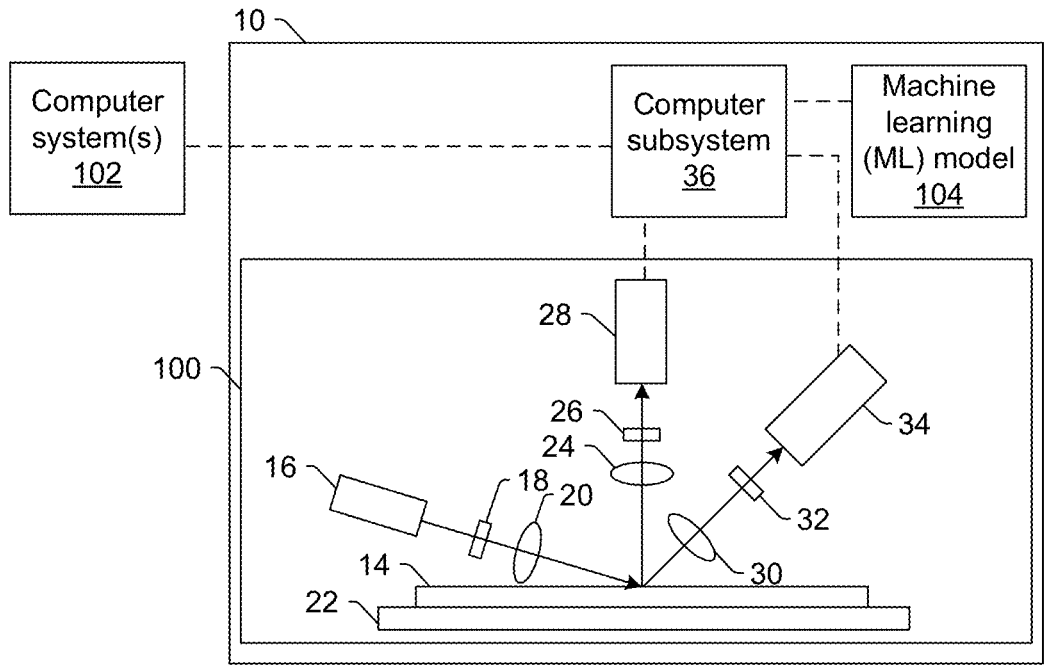
FIGS. 1, 1a, and 1b are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for determining information for a specimen for metrology and/or inspection applications, e.g., classifying defects detected on a specimen. Certain embodiments relate to using global texture-based characteristic(s) to augment local characteristic(s) such as those determined by Principal Component Analysis (PCA) as inputs to a machine learning (ML) model such as a convolutional neural network (CNN) for metrology of specimen structures and/or classification of detected defects. In this manner, the embodiments described herein use global texture characteristic(s) as supplemental input for image classification. In addition, the embodiments described herein may be configured for restoring signal from global texture patterns to complement local feature-based dimensional reduction techniques for deep learning (DL) applications.

Historically, texture analysis fell under the umbrella of signal processing, a rich domain where understanding of global patterns is essential. With the developments of the last decade in terms of image processing using neural networks and DL, there has been renewed interest in signal processing knowledge which could benefit from modern image processing capabilities. Texture analysis had been a painstaking process, requiring hand tuning by signal processing experts to elicit meaningful results. With the exception of certain very specialized roles requiring ongoing human expertise, much of the parameter-heavy signal processing work was automated and largely neglected in recent decades.

Recently developed technology has led to some renewed interest in the advancements still possible in signal processing. ML, particularly DL, has revolutionized image processing despite largely circumventing signal processing domain knowledge, leaving underexplored areas of overlap. For example, CNNs now remove much of the burden of manually tuning signal processing parameters as neural networks can align to complex systems such as textured patterns with minimal manipulation. Using CNNs can even greatly simplify the aspects of texture that are computed.

"Texture" as that term is used herein is defined as global patterns that are present in an image such as repeated, relatively widespread patterns that convey something about the global state or an underlying pattern within data such as images. Texture in the case of images is therefore patterned information which is foundational across a relatively large region ("globally"). It is different from noise which is useless and localized and obscures localized signal. Texture can refer broadly to some global characteristics that distinguish one image from similar images or which underly a specific pattern. Many different kinds of global features can be characterized as textures. Though texture is often dismissed as background or normalized to achieve more uniformity between images, the inventors have found that it can convey important information about state which may be useful for improving classification of images and other texture-sensitive data.

How "global" a texture has to be for it to be considered a "global texture characteristic" as that term is defined herein may be use case dependent, but in the context of the embodiments described herein "global" can generally be defined as significantly larger than the pixels corresponding to a detected defect or a specimen structure. In some instances, a texture characteristic can be "global" in the sense that it is computed across an entire image (e.g., an entire spectra image). However, a texture characteristic may be "global" in the sense that it is computed across an entire die, a section of a specimen (e.g., a wafer), or even just a region of a die. The size of the "global" region may also be highly dependent on the factors that are inducing texture differences. For example, if there is a shift in, say, lighting between the left half of a die row and the right half, that would be a texture difference, the explicit consideration of which could improve sensitivity of the applications in which the embodiments are used.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen is shown in FIG. 1. In some embodiments, system 10 includes an imaging subsystem such as imaging subsystem 100. The imaging subsystem includes and/or is coupled to a computer subsystem, e.g., computer subsystem 36 and/or one or more computer systems 102. In one embodiment, an image of a specimen is generated by an imaging subsystem configured to generate the image using light. In the embodiments shown in FIG. 1, the imaging subsystem is configured as a light-based imaging subsystem. However, in other embodiments described herein, an image of a specimen is generated by an imaging subsystem configured as an electron beam or charged particle beam imaging subsystem. In this manner, in other embodiments, the imaging subsystem is configured to generate the image using electrons.

In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected.

In the light-based imaging subsystems described herein, the energy directed to the specimen includes light, and the energy detected from the specimen includes light. For example, in the embodiment of the system shown in FIG. 1, the imaging subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, if the system is configured as an inspection system, the computer subsystem may be configured to detect events (e.g., defects and potential defects) on the specimen using the output of the detectors. Detecting the events on the specimen may be performed as described further herein.

Computer subsystem 36 may be further configured as described herein. For example, computer subsystem 36 may be configured to perform the steps described herein. As such, the steps described herein may be performed "on-tool," by a computer subsystem that is coupled to or part of an imaging subsystem. In addition, or alternatively, computer system(s) 102 may perform one or more of the steps described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool. In some embodiments described herein, one or more of the computer subsystems may be configured as a GPU because GPUs are a particularly useful computer subsystem on which to run the texture analysis described further herein due to their more efficient matrix processing.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron beam imaging subsystem. In an electron beam imaging subsystem, the energy directed to the specimen includes electrons, and the energy detected from the specimen includes electrons. In one such embodiment shown in FIG. 1a, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 1A:
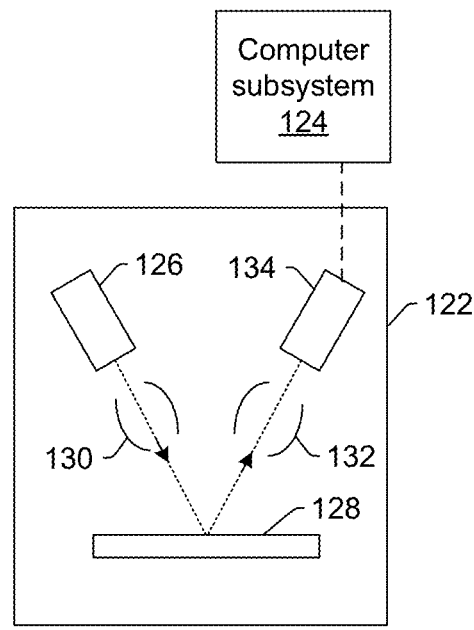

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described above or in any other suitable manner. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystem described above, the electron beam imaging subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1a except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" can be defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The imaging subsystem may be configured to scan the specimen with the different modes in the same scan or different scans, e.g., depending on the capability of using multiple modes to scan the specimen at the same time.

In one embodiment, the image is generated by an imaging subsystem configured for inspection of the specimen. In this manner, the systems described herein may be configured as inspection systems. However, the systems described herein may be configured as another type of semiconductor-related quality control type system such as a defect review system and a metrology system. For example, the embodiments of the imaging subsystems described herein and shown in FIGS. 1 and 1*a* may be modified in one or more parameters to provide different imaging capability depending on the application for which they will be used. In one embodiment, the imaging subsystem is configured as an electron beam defect review subsystem. For example, the imaging subsystem shown in FIG. 1*a* may be configured to have a higher resolution if it is to be used for defect review or metrology rather than for inspection. In other words, the embodiments of the imaging subsystem shown in FIGS. 1 and 1*a* describe some general and various configurations for an imaging subsystem that can be tailored in a number of manners that will be obvious to one skilled in the art to produce imaging subsystems having different imaging capabilities that are more or less suitable for different applications.

In one embodiment, the image is generated by an imaging subsystem configured for metrology of the specimen. In this manner, the imaging subsystem may be configured as and/or included in a metrology tool. The metrology tool may have any suitable configuration known in the art. In one example, the imaging subsystems shown in FIGS. 1 and 1*a* may be configured and used for metrology as described above. In addition, if the same subsystem has variable hardware settings such that it can be used for multiple applications (e.g., both inspection and metrology), then the same subsystem can be used for both inspection and metrology.

An imaging subsystem configured for inspection will, however, generally be configured to have a resolution lower than the resolution of a metrology tool during a metrology process (or a defect review tool during a defect review process). For example, even if the imaging subsystems described herein are configurable to have relatively high resolutions that would render them suitable for metrology (or defect review), during an inspection process, the imaging subsystem would be configured for a lower resolution to improve the throughput of the inspection process (especially since such a high resolution is not typically necessary or required for the inspection processes described herein).

Figure 1B:
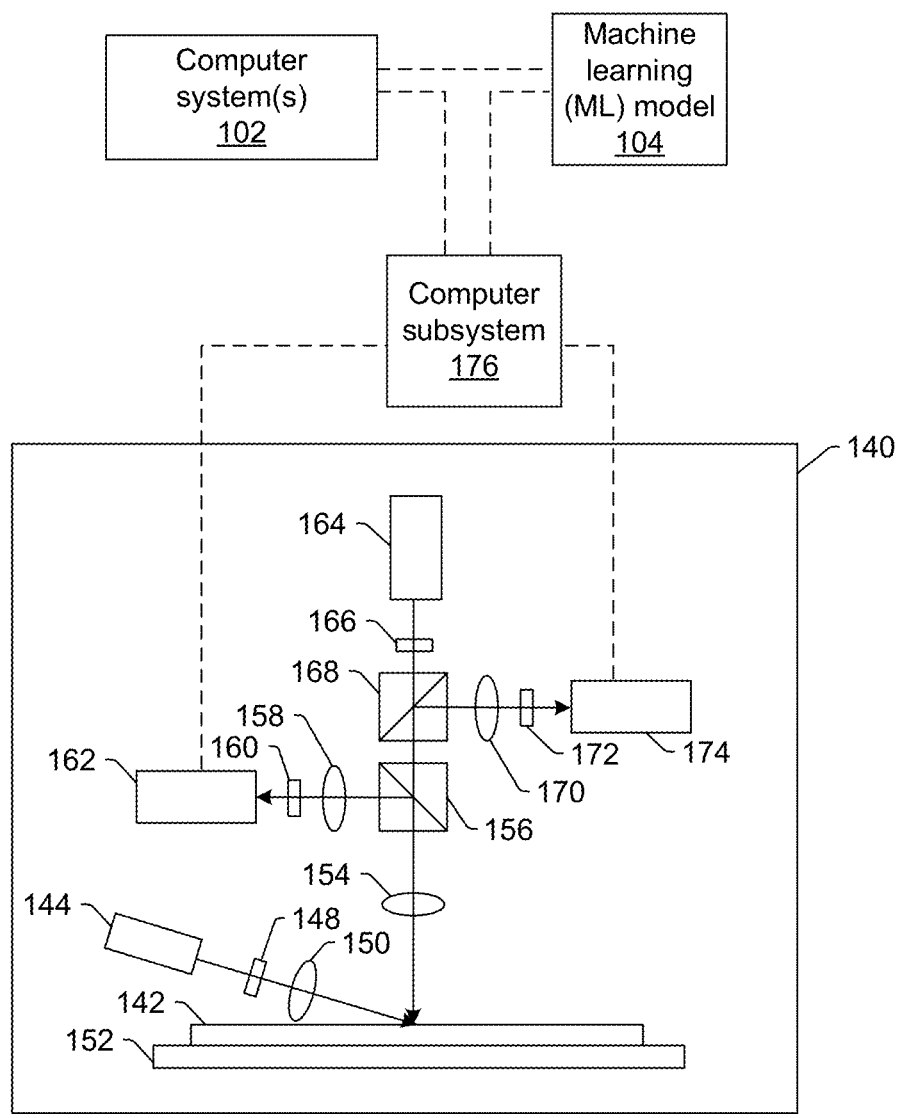

FIG. 1*b*, however, shows another embodiment of a metrology tool that includes an imaging subsystem and may perform measurements on the specimen as described herein. In the case of an optical metrology tool, the imaging subsystem may include an illumination subsystem configured to direct light having one or more illumination wavelengths to a specimen. For example, in the metrology tool embodiment shown in FIG. 1*b*, the illumination subsystem of metrology tool 140 includes light sources 144 and 164, which may include any of the light sources described herein. Light generated by light source 144 may be directed through one or more spectral filters 148 of the illumination subsystem. Spectral filter(s) 148 may be configured as described further herein. The illumination subsystem may also include objective 150 configured to focus light having one or more illumination wavelengths from spectral filter(s) 148 to specimen 142, which may include any of the specimens described herein. Light generated by light source 164 may also be directed through one or more spectral filters 166 and transmitted by beamsplitters 168 and 156. Spectral filter(s) 166 may be configured as described further herein. The illumination subsystem may also include objective 154 configured to focus light having one or more illumination wavelengths to specimen 142.

In one embodiment, the illumination subsystem includes a broadband light source. For example, light source 144 and/or light source 164 shown in FIG. 1*b* may be a broadband light source, and one or more spectral filters 148 and/or one or more spectral filters 166 may be positioned in a path of light from the broadband light source. Therefore, the metrology tool may include a broadband source with a selectable wavelength range for illumination through wavelength dependent filters. For example, the wavelength(s) directed to the specimen may be altered by changing or removing the spectral filter(s) positioned in the path of the light from the light source(s). In this manner, the metrology tool may be configured to have flexible illumination wavelength(s) that can be varied depending on the materials on the specimen.

The metrology tool may also incorporate narrower or modified bandpass filters into the illumination subsystem. In one such embodiment, the one or more spectral filters include one or more interference filters. For example, spectral filter(s) 148 and/or 166 may be interference filter(s). In this manner, the metrology tool may include a broadband source with a selectable wavelength range for illumination through interference filters. These filters can complement or replace bandpass filters currently being used in tools.

In additional embodiments, light source 144 and/or light source 164 may include one or more narrowband light sources or one or more laser light sources. The narrowband and/or laser light sources may include any suitable such light sources such as one or more diode lasers, diode-pumped solid state (DPSS) lasers, gas lasers, etc. In addition, the illumination subsystems described herein may include any number of broadband, narrowband, and laser light sources in any suitable combination. Furthermore, the light sources may be quasi-monochromatic light sources. Any of the light sources and illumination subsystem configurations described herein may be included in a metrology tool having any suitable configuration. Therefore, many different combinations of light sources and metrology tool configurations are possible and may be selected depending on, for example, the specimen and/or specimen characteristics that are to be measured by the tool.

The illumination subsystem may be configured in a number of different ways for selective illumination angle and/or polarization. For example, the illumination angle may be altered or selected by changing a position of one or more light sources of the illumination subsystem or by controlling one or more other elements of the illumination subsystem that affect the illumination angle. The illumination angle that is altered or selected may be the polar angle and/or the azimuthal angle of the incident light. In addition, the illumination polarization may be selected by selecting a light source that emits light having the selected polarization or by including one or more polarization selection/alteration/filtering elements (not shown) in the path of the light emitted by one or both of the light sources.

The metrology tool also includes a detection subsystem configured to detect light from the specimen. As shown in FIG. 1b, the detection subsystem includes objective 154 configured to collect light from specimen 142. The collected light may include specularly reflected light and/or scattered light. The detection subsystem may also include beamsplitter 156 configured to transmit a first portion of the light collected by the objective lens and to reflect a second portion of the light collected by the objective lens. The metrology tool may also include beamsplitter 168 positioned in the path of the light transmitted by beamsplitter 156 and configured to reflect some or all of the first portion of the light that was transmitted by beamsplitter 156. The beamsplitters may be configured to reflect and transmit the light based on wavelength or any other light characteristics. The beamsplitters may also include 50/50 beamsplitters or any other suitable beamsplitters known in the art.

The light that is reflected by each of the beamsplitters may be directed to different detectors, possibly with one or more components positioned in front of the detectors. For example, the imaging subsystem may include refractive lens 158 positioned in the path of the light reflected by beamsplitter 156 and one or more bandpass filters 160 that may be configured as described further herein and may transmit light having one or more selected wavelengths. Beamsplitter 156 and/or bandpass filter(s) 158 may be configured to selectively transmit light having one or more selected wavelengths and to reflect or otherwise block light that does not have the one or more selected wavelengths out of the detection path of the detection subsystem such that they are not detected by detector 162. In a similar manner, the imaging subsystem may include refractive lens 170 positioned in the path of the light reflected by beamsplitter 168 and one or more bandpass filters 172 that may be configured as described further herein and may transmit light having one or more selected wavelengths. One or more of beamsplitter 156, beamsplitter 168, and bandpass filter(s) 172 may be configured to selectively transmit light having one or more selected wavelengths and to reflect or otherwise block light that does not have the one or more selected wavelengths out of the detection path of the detection subsystem such that they are not detected by detector 174. In this manner, detectors 162 and 174 may detect light having different wavelengths.

In one embodiment, the illumination and detection subsystems include a common objective lens and a common dichroic mirror or beamsplitter, which are configured to direct the light from a light source of the illumination subsystem to the specimen and to direct the light from the specimen to a detector of the detection subsystem. For example, as shown in FIG. 1b, the illumination and detection subsystems may both include objective 154 making it a common objective lens and beamsplitters 156 and 168 making them common dichroic mirrors or beamsplitters. As described above, objective 154 and beamsplitters 156 and 168 are configured to direct the light from light source 164 of the illumination subsystem to specimen 142 and to direct the light from the specimen to detector 162 and/or detector 174 of the detection subsystem.

In one embodiment, one or more wavelengths of the light detected by the detection subsystem are selected by altering one or more parameters of the detection subsystem based on one or more materials on the specimen, one or more characteristics of the specimen that are being measured, or some combination thereof. Therefore, like the illumination wavelength range, the detection wavelength range can be adjusted depending on the specimen materials and the specimen characteristic(s) being measured. The wavelength(s) detected by the detection subsystem may be altered as described herein (e.g., using bandpass filter(s)) or in any other suitable manner known in the art.

In one embodiment, the detection subsystem includes two or more channels configured to separately and simultaneously detect the light from the specimen in different wavelength ranges. For example, the metrology tool can be configured to include multiple parallel imaging channels that image varying wavelength ranges through suitable selection of dichroic and bandpass filter components. In the embodiment shown in FIG. 1b, one of the channels may include bandpass filter(s) 160 and detector 162 and the other of the channels may include bandpass filter(s) 172 and detector 174. In addition, the metrology tool may include more than two channels (e.g., by insertion of one or more additional beamsplitters (not shown) into the path of the light from the specimen, each of which may be coupled to a detector (not shown) and possibly spectral filters (not shown) and/or other optical elements (not shown)). The channel including bandpass filters(s) 160 and detector 162 may be configured to detect light in a first wavelength band, and the channel that includes bandpass filter(s) 172 and detector 174 may be configured to detect light in a second wavelength band. In this manner, different wavelength ranges of light may be detected by different channels simultaneously. In addition, the different wavelength ranges may be mutually exclusive (e.g., separated by one or more wavelengths) or may overlap entirely (e.g., one wavelength range may be entirely within another wavelength range) or partially (e.g., multiple wavelength ranges may include the same one or more wavelengths, but at least some of the wavelengths in a first wavelength range are mutually exclusive of at least some of the wavelengths in a second wavelength range, and vice versa). In some embodiments, the detection subsystem includes a spectrometer configured to measure a characteristic of the light from the specimen across a wavelength range. For example, in the embodiment shown in FIG. 1b, one or more of detectors 162 and 174 may be a spectrometer.

As described above, the detection subsystem may be configured to selectively and separately detect the light from the specimen based on the wavelength of the light. In a similar manner, if the illumination subsystem is configured for selective illumination angle and/or polarization, the detection subsystem may be configured for selective detection of light based on angle from the specimen (or collection angle) and/or polarization. For example, the detection subsystem may include one or more apertures (not shown) that can be used to control the collection angles of the light detected by the detection subsystem. In another example, the detection subsystem may include one or more polarizing components (not shown) in the path of the light from the specimen that can be used to control the polarizations of the light detected by the detection subsystem.

The metrology tool also includes a computer subsystem configured to perform one or more steps described herein using output generated by the detection subsystem responsive to the detected light. For example, in the embodiment shown in FIG. 1b, the metrology tool may include computer subsystem 176, which may be coupled to detectors 162 and 174 by one or more transmission media shown in FIG. 1b by the dashed lines, which may include "wired" and/or "wireless" transmission media, such that the computer subsystem can receive output generated by the detectors of the detection subsystem that is responsive to the detected light. The output of the detectors may include, for example, signals, images, data, image data, and the like. For example, the detector(s) may be imaging detectors that are configured to capture image(s) of the specimen. The computer subsystem may be further configured as described herein.

The embodiment shown in FIG. 1b may also include one or more other elements that may be configured as described herein. For example, metrology tool 140 may include stage 152 that may be configured as described further herein for positioning and/or moving specimen 142. The system shown in FIG. 1b may also include computer subsystem(s) 102 and ML model 104, which may also be configured as described further herein.

It is noted that FIG. 1b is provided herein to generally illustrate some configurations of the metrology tool embodiments described herein. Obviously, the metrology tool configurations described herein may be altered to optimize the performance of the metrology tool as is normally performed when designing a commercial metrology tool. In addition, the metrology tools described herein may include an existing metrology tool (e.g., by adding functionality described herein to an existing metrology tool) such as Archer, ATL, AcuShape, SpectraShape, SpectraFilm, Aleris, WaferSight, Therma-Probe, RS-200, CIRCL, and Profiler tools that are commercially available from KLA. For some such systems, the methods described herein may be provided as optional functionality of the existing metrology tool (e.g., in addition to other functionality of the existing tool). Alternatively, the metrology tool described herein may be designed "from scratch" to provide a completely new system.

Although the metrology tool shown in FIG. 1b is a light-based or optical tool, it is to be understood that the metrology tool may be configured to also or alternatively use a different type of energy to perform the measurements described herein. For example, the metrology tool may be an electron beam-based tool such as a scanning electron microscope (SEM) or a transmission electron microscope (TEM) and/or a charged particle beam-based tool such as a focused ion beam (FIB) tool. Such metrology tools may include any suitable commercially available metrology tool.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

Figure 2:
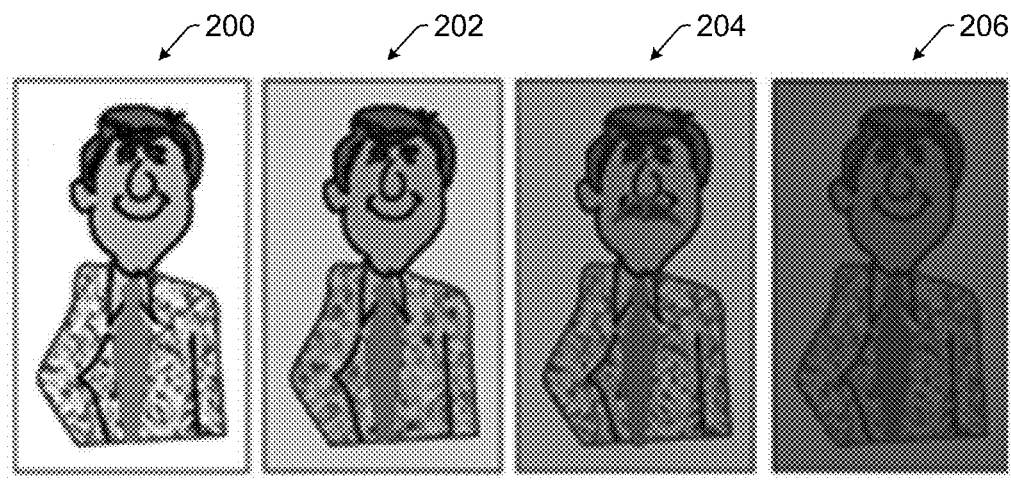
FIG. 2 includes illustrative examples of images showing different signals, noises, and textures.

The system includes a computer subsystem, which may include any configuration of any of the computer subsystem(s) or system(s) described above. The computer subsystem is configured for determining a global texture characteristic of an image of a specimen and one or more local characteristics of a localized area in the image. As described further above, a global texture characteristic is different from localized characteristics and other signals such as noise. FIG. 2 includes some illustrative examples of images unrelated to the applications described herein, which nevertheless show some basic image characteristics described herein. In particular, if each image shown in FIG. 2 is considered a die and each image is compared to each other image for die-to-die comparison type defect detection, then the localized defect signal would be the mustache shown in image 204, which is not present in images 200, 202, and 206. In images 200, 202, 204, and 206, noise is illustrated by the random pattern in the suit jacket, and texture is illustrated by the lighting differences in the images. Therefore, as can be seen from these images, signal, noise, and texture are completely different components of images.

In one embodiment, determining the global texture characteristic includes computing an autocorrelative texture of the image. For example, correlation step 302 shown in FIG. 3 may be performed on input 300. Input 300 may be a dataset, e.g., 11×135×2 matrices, for the image or the image itself. This correlation step may include determining correlations between filter i and j according to the following formula:

$$G_{ij} = \Sigma_k F_{ik} F_{jk}.$$

Figure 3:
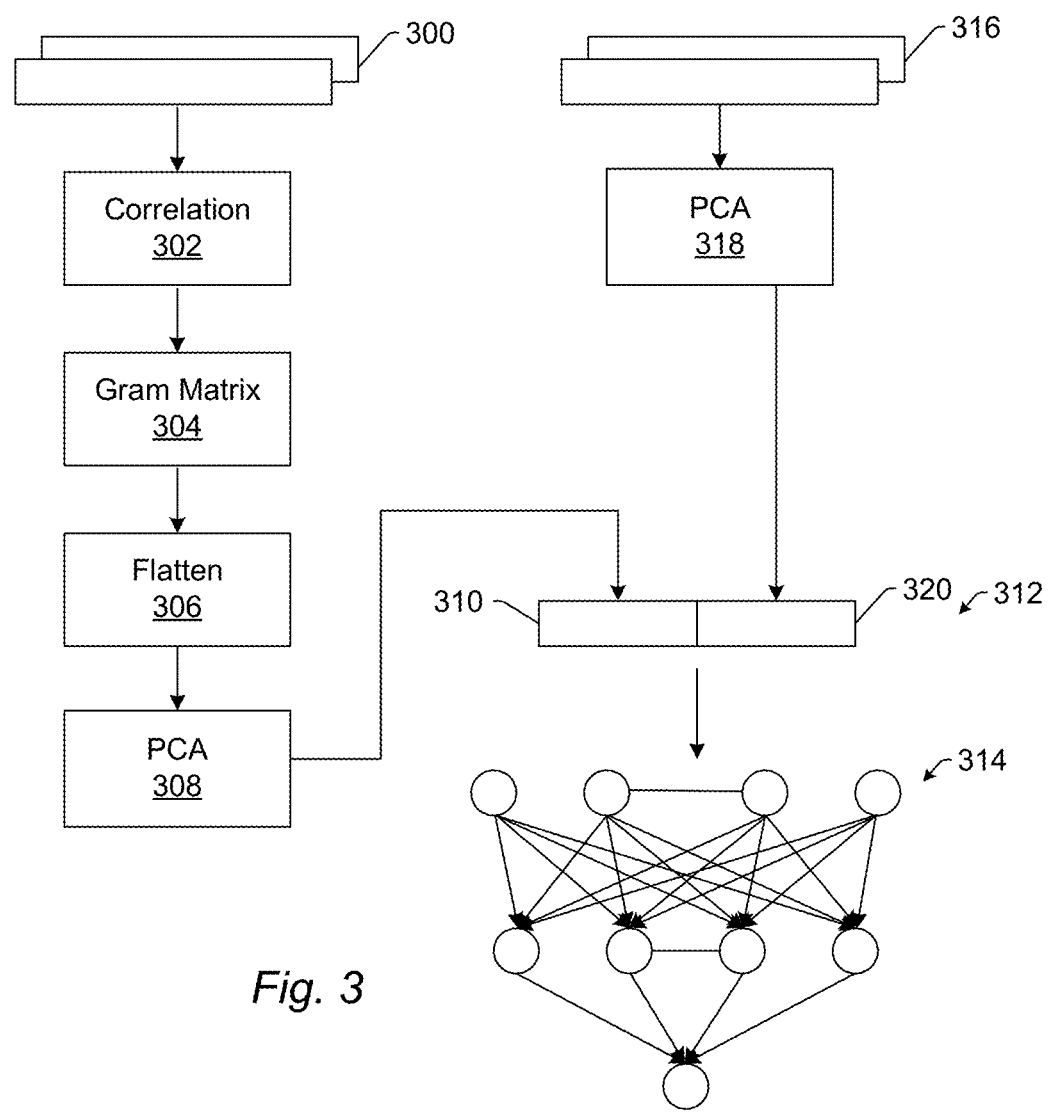
FIG. 3 is a flow chart illustrating an embodiment of steps that may be performed for determining information for a specimen.

In another embodiment, determining the global texture characteristic includes computing an autocorrelative texture of the image using a Gram Matrix, flattening the autocorrelative texture, and reducing the dimensionality of the flattened autocorrelative texture by Principal Component Analysis (PCA). For example, input 300 may be processed using Gram Matrices to compute the autocorrelative texture. Output of correlation step 302 may be Gram Matrix 304 as shown in FIG. 3, which may have the following format:

$$\begin{bmatrix} - & - & - \\ x & - & - \\ x & x & - \end{bmatrix}.$$

The textures may then be flattened and dimensionality reduced (e.g., with PCA). For example, the Gram Matrix may be input to flatten step 306 shown in FIG. 3, which may be performed in any suitable manner known in the art. The output of the flattening step may be input to a dimensionality reduction step, which may include PCA step 308 shown in FIG. 3. The output of the PCA step may then be input into channel 310 of input 312 for ML model 314, which may be configured as described further herein.

Autocorrelative texture is just one of many possibilities chosen by the inventors for the global texture characteristic because it is easily calculated, stable, and a strong encoder of texture consistency, but these qualities do not mean it is necessarily a comprehensive representation of all predictive texture information available in image classification problem spaces. In another embodiment, the global texture characteristic includes marginal constraints, magnitude correlation constraints, or cross-scale phase constraints. For example, the embodiments described herein may incorporate other types of texture components such as magnitude, marginal, and cross-phase correlations. Future research could explore such other texture flavors to see whether further predictive classification features can be derived from these multifarious texture patterns.

Although the embodiments described herein are described as determining a global texture characteristic, the embodiments described herein may be configured for determining and using any suitable number of global texture characteristics from any of the images described herein. Furthermore, although some embodiments may be described herein with respect to a localized area or a defect, the embodiments may be configured and used for determining information for any number of localized areas on a specimen and/or defects detected on a specimen.

The global texture characteristic(s) that are used in any given use case may be configurable in several possible ways. One way is that the user may select which global texture characteristic(s) are computed by the computer subsystem and input to the ML model. Another way is that the computer subsystem may be configured to compute some predetermined set of global texture characteristic(s) and during training, the ML model may weight the computed global texture characteristic(s) according to how useful they appear to be for predicting accurate information, e.g., defect classifications (including possibly weighting some global texture characteristic(s) so that they are not used for determining information).

In some embodiments, determining the one or more local characteristics of the localized area in the image includes PCA of the image. For example, input 316 may be input to PCA step 318 as shown in FIG. 3, and the output of this step may be input to channel 320 of input 312 for ML model 314. Inputs 300 and 316 may be the same input that is processed in parallel as described herein. In this manner, the local characteristic(s) and global texture characteristic are combined for input to the ML model.

The inventors have found that with challenging datasets represented as images for determining information and/or classification using DL, performance can be hindered by excessive noise in the data. As a result, the inventors wanted to find effective dimensionality reduction and feature selection techniques to improve the performance of neural networks such as those described herein. The impetus of the texture research that resulted in the embodiments described herein was also the difficulty of improving on the performance of a multi-layer perceptron (MLP) with PCA-derived inputs of the dataset. PCA is a powerful technique that uses linear algebra to capture independent trends of data features, distilling the most prescient characteristics into the principal components (PCs). PCA so effectively represents local features that improving on its general performance in that area is impractical. In addition, because PCA has already established the most effective, general way to express the essence of the data with respect to local features, augmenting the PCs with information derived from analogous feature-dependent analysis tends to be ineffective. However, the inventors have found that PCA neglects some important information that can provide further insight into a dataset; namely, the PCs broadly disregard global patterns known as textures. For example, PCA dismisses global patterns such as autocorrelative textures that provide information about an image relevant to the information it contains and/or its classification. Experiments described herein have demonstrated an improvement in training error, validation error, and testing error compared to the next most effective approach to classify training data. In particular, in order to improve the accuracy of the test results, several different feature generation strategies were tried by the inventors. The approach with the most promising results was by far the augmentation of PCs with global texture data.

In one embodiment, the one or more local characteristics of the localized area in the image include user-selected features determined from the localized area of the image. In a further embodiment, a defects is detected in the image, and the one or more local characteristics include user-selected features determined from the image, an additional image used with the image for detecting the defect, a further image generated from the image and the additional image by a method that detected the defect, or a combination thereof. For example, the embodiments described herein can substitute PCA features for other localized features, such as the hand-selected features used by some metrology or inspection tools. Such local characteristic(s) may be for an additional image such as a reference image subtracted from the test image in which the defect is detected for defect detection. The reference image may include any of the reference images described herein. A further image for which the local characteristic(s) may be determined and used for determining information and/or classification may also or alternatively include a difference image generated by subtracting a reference image from the test image. A further image for which local characteristic(s) are determined may include any other image generated by the defect detection method or algorithm from the test image, possibly with one or more other images.

In the case of inspection, the local characteristic(s) determined from any of these images may be combined with those determined from a test image in which a defect is detected. In the case of inspection or metrology, if localized features are determined from more than one image and used in the embodiments described herein, the localized features determined from each image may be the same or different. For example, one expert-selected feature may be determined from a test image, while a different expert-selected feature may be determined from a reference image. Furthermore, the images from which localized features are determined may include images generated using only one mode of the imaging subsystem or images generated using more than one mode of the imaging subsystem. The embodiments described herein may also determine and use a combination of PCA-determined local characteristic(s) and hand-selected local characteristic(s). Which local characteristic(s) are determined and used in the embodiments described herein may be selected as described further herein. While expert-selected features can improve over PCA in very specific use cases, these features tend to be comparable to PCA features in that they emphasize localized features but ignore global texture information.

The system also includes one or more components executed by the computer subsystem. The one or more components include an ML model configured for determining information for the specimen based on the global texture characteristic and the one or more local characteristics. For example, as shown in FIG. 1, the system may include ML model 104. In another example, as shown in FIG. 3, the system may include ML model 314. Although ML model 314 is shown to include a particular architecture in which the first layer may include about 100 nodes and the second layer includes about 64 nodes, the ML model may have any configuration described herein.

In one embodiment, the computer subsystem is configured for supervised training of the ML model using labeled images of the specimen or another specimen of a same type as the specimen. For example, the computer subsystem may obtain a dataset of labeled images and split them into train, test, and validation image sets. The autocorrelation of each image may be computed as described further herein to capture global texture characteristics (e.g., element-wise matrix multiplication). The computer subsystem may also compute the PCs (or other localized features) of each image as described further herein. The computer subsystem may then perform supervised training, with validation, using CNNs, MLPs, or another ML model described herein with local characteristic(s) and global texture characteristic(s) as inputs. The supervised training may otherwise be performed in any suitable manner known in the art. The trained model may then be used to determine information from the specimen images and/or to classify test images.

In one embodiment, the ML model includes an MLP. The MLP may be a relatively shallow neural net configured and trained for classification. In another embodiment, the ML model includes an MLP that includes only two hidden layers. For example, the best performing embodiment discovered by the inventors was a combination of a relatively shallow MLP with only two hidden layers and the global texture characteristic and local characteristic(s) as inputs to the MLP, which outperformed every CNN with only local characteristics that was tried by the inventors.

In a further embodiment, the ML model includes an MLP that includes only first and second hidden layers, and the first hidden layer includes about four times as many nodes as the second hidden layer. For example, the inventors conducted experiments using MLFlow to compare performance with a combinatoric variety of training parameters such as learning rate, batch size, and number of hidden nodes in each of the two hidden network layers. The best performing MLP for PCA+Texture, meaning that a global texture characteristic and local characteristic(s) determined by PCA are input to an MLP, had a first hidden layer with about 4 times as many nodes as were in the second hidden layer. In the MLP described above with only two hidden layers, the first layer may include about 2000 nodes, and the second layer may include about 500 nodes, which was found to be the best performing MLP in the embodiments described herein. Within the entire parameter space explored by the inventors, the PCA+global texture MLP classifier consistently demonstrated the strongest performance with regards to achieving a lower classification test error on the dataset used for experiments.

In a further embodiment, the ML model includes a CNN. For example, although the inventors have found that the embodiments described herein perform particularly well with an MLP, other configurations of a neural network or CNN may be used and trained for the information determination described herein. If the ML model is a CNN, the CNN may include any suitable types of layers such as convolution, pooling, fully connected, soft max, etc., layers having any suitable configuration known in the art. The CNN may be trained as described herein or in any other suitable manner known in the art.

The inventors examined the performance of the embodiments of the features and model configurations described herein compared to several other different combinations of features and model configurations to determine how well the embodiments described herein performed. Those results are shown in Table 1 below as 30 train, validation, and test errors by input and classifier. The sizes of the train set, the validation set, and the test set were 4434, 229, and 508, respectively. The results for the embodiments described herein are included in the column labeled Texture+PCA+MLP, meaning that a global texture characteristic and local characteristic(s) determined by PCA are input to an MLP. The other feature/model configuration combinations to which that embodiment was compared include: PCA+MLP (meaning local characteristic(s) determined by PCA input to an MLP), CNN+MLP (meaning local characteristic(s) determined by a CNN that are input to an MLP), and PCA+CNN+MLP (meaning local characteristic(s) determined by PCA and a CNN input to an MLP). Each of the errors is Error 3 sigma=3*std(y−y_pred).

|  | PCA + MLP | CNN + MLP | PCA + CNN + MLP | Texture + PCA + MLP |
|---|---|---|---|---|
| Train Error | 0.244 | 0.48 | 0.192 | 0.14 |
| Validation Error | 0.279 | 0.425 | 0.219 | 0.182 |
| Test Error | 0.215 | 0.405 | 0.224 | 0.185 |

The results presented in Table 1 show that the Texture+PCA+MLP combination provides a substantial improvement on training error which translated into a significant reduction of validation and test error as well. The results clearly show that the embodiments described herein provide improvement in validation and test performance over classification performed using PCA-determined local characteristic(s) due to the inclusion of global texture in training. The experimental results also showed significant improvement in classification test error using PCA+global texture as input to an MLP compared to several alternative techniques for feature generation and classification. In addition, the embodiments described herein provide significant improvement on test performance for (DL) classification methods and/or algorithms at the boundary where elements become most difficult to automatically separate based on previously underutilized features. Furthermore, the embodiments described herein can reduce test error by over 10% (of the baseline error) based on initial testing of prototype, which sets the classification described herein apart from other currently used classification methods and algorithms. As competing approaches were employing existing best known methods (BKMs), a noticeable and consistent improvement of several percent across all error categories as demonstrated here is hard to achieve.

In order to compare the results more comprehensively, the inventors also tried various numbers of PCs to see if using fewer, the same number, or more features could match the effectiveness of the PCA+global texture feature set. The final size of the PCA+global texture data was 200 features, of which half came from PCA and half came from autocorrelative texture analysis. The accuracy of these results significantly outperformed PCA features as the sole input, even when the number of PCs used was systematically varied between 50 and 200 to see if equivalent signal could be found with some quantity of PCs. From around 60 PCs, there were diminishing marginal returns to test performance. Around 100 PCs, the improvements plateaued so small variations in the number of PCs had little effect on performance. With more than 120 PCs, the performance implied overfitting of the model, as test accuracy actually worsened.

From these results, there appears to be significant predictive data being lost by PCA itself which is recaptured through global texture-derived features. In particular, global texture information, specifically autocorrelative texture, provides predictive patterns that are lost when only localized features are considered. PCA and other common dimensionality reduction and feature generation techniques focus exclusively on these localized types of features as do expert-curated feature sets. No other technique for automated feature selection and dimensionality reduction achieved comparable results, either alone or as a supplement to PCA features. Therefore, the research supports the hypothesis that global pattern information captured in global texture analysis provides predictive features that are neglected by other feature generation techniques that rely too heavily on localized features. Hence, adding a dense feature map from global textures back into the input improved the strongest local-feature dependent performance by restoring lost pattern information to augment PCA.

While global textures naturally suit unsupervised ML provided by neural networks such as those described herein, it is also possible that the global patterns could also effectively be distilled into features better suited for the classical ML and non-ML classification techniques. In other words, it is conceivable that global texture characteristic(s) determined as described herein may be input in combination with the local characteristic(s) such as those described herein into any currently used classification method and/or algorithm.

In some embodiments, the image is a low resolution image. The term "low resolution image" of a specimen, as used herein, is generally defined as an image in which all of the patterned features formed in the area of the specimen at which the image was generated are not resolved in the image. For example, some of the patterned features in the area of the specimen at which a low resolution image was generated may be resolved in the low resolution image if their sizes are large enough to render them resolvable. However, the low resolution image is not generated at a resolution that renders all patterned features in the image resolvable. In this manner, a "low resolution image," as that term is used herein, does not contain information about patterned features on the specimen that is sufficient for the low resolution image to be used for applications such as defect review, which may include defect classification and/or verification, and metrology. In addition, a "low resolution image" as that term is used herein generally refers to images generated by inspection systems, which typically have relatively lower resolution (e.g., lower than defect review and/or metrology systems) in order to have relatively fast throughput.

The "low resolution images" may also be "low resolution" in that they have a lower resolution than a "high resolution image" described herein. A "high (or higher) resolution image" as that term is used herein can be generally defined as an image in which all patterned features of the specimen are resolved with relatively high accuracy. In this manner, all of the patterned features in the area of the specimen for which a high resolution image is generated are resolved in the high resolution image regardless of their size. As such, a "high resolution image," as that term is used herein, contains information about patterned features of the specimen that is sufficient for the high resolution image to be used for applications such as defect review, which may include defect classification and/or verification, and metrology. In addition, a "high resolution image" as that term is used herein generally refers to images that cannot be generated by inspection systems during routine operation, which are configured to sacrifice resolution capability for increased throughput.

The embodiments described herein are particularly suitable for use with, on, or by inspection tools and can improve classification of defects by DL algorithms. For example, in one embodiment, a defect is detected in the image, and determining the information includes classifying the detected defect. In such instances, the localized area of the specimen image may correspond to the area of the detected defect. However, the localized area may be different than the detected defect area if a localized area around the detected defect is particularly useful for determining information for and/or classifying the defect. Some inspection tools such as e-beam tools are already using DL techniques due to the generally higher resolution of their images (compared to other inspection tool types) which can provide a greater sense of features which can be detected by PCA and comparable feature extraction methods. Many other inspection tools, however, must work with lower resolution images to detect features because the resolution of those tools is limited due to their greater speed and use of light/optics. Therefore, global texture would provide even more significant information for these tools due to the increased difficulty of discerning features clearly from the images that they generate.

Optical inspection tools generally produce images that are rife with textures. However, none of the currently used optical inspection tools intentionally incorporates global texture information as input to image/defect classification techniques at this time. The classification pre-processing and input account for the binary separation of signal and noise, focusing on signal-to-noise ratio (SNR) at localized features on each die.

While this signal/noise separation approach has been effective for decades, each new generation of tools must detect smaller yield-lowering defects printed at shorter and shorter wavelengths. This push for more sensitive classification algorithms and more standardized references presents ongoing technical challenges. Optical defect classification may benefit from the consideration of global texture information as a distinct category of information from the standard signal and noise dichotomy.

Although the embodiments described herein are particularly useful for lower resolution (such as optical) classification where textures can play a bigger role relative to signal, the embodiments described herein are generally applicable to any kind of images regardless of their resolution. In higher resolution image cases, for example, with relatively strong texture patterns, the embodiments may be useful. Certain design care areas (e.g., adjacent, relatively thin lines) may have enough autocorrelation to be informative for detection or reference generation. In other higher resolution cases, however, the benefit of the embodiments described herein may be relatively marginal compared to currently used methods because the higher resolution can increase signal significantly.

In another embodiment, a defect is detected in the image, determining the information includes classifying the detected defect, and classifying the detected defect includes determining if a portion of the image corresponding to the detected defect is a localized defect signal or localized noise. In this manner, the ML model may be used for separating defects from noise after some other method or algorithm has detected the defects. The systems and methods described herein may therefore only perform the steps described herein for portions of specimen images at which a defect has been detected. As such, separate methods or algorithms may be used for detection and classification. However, the global texture and local characteristics described herein may be used for classification that simply separates detected defects (also commonly referred to as "events") into defects and noise. In this manner, the classification performed by the ML model may be a kind of nuisance event or noise filter, which may or may not be followed by a classification that assigns a type of defect to the remaining detected defects not filtered out as nuisance or noise.

The detected defects for which the steps described herein are performed may be detected using any suitable defect detection method or algorithm known in the art including ML and non-ML defect detection methods and algorithms. In some instances, the ML models described herein can be configured and used for defect detection as well. For instance, global texture information might be helpful in single image unsupervised detection for a strongly patterned case such as memory regions in semiconductor devices. However, for general defect detection, the global texture information described herein is most useful as an additional contrast between data for supervised classification.

In some embodiments, a defect is detected in the image, the computer subsystem is configured for determining an additional global texture characteristic of an additional image used with the image for detecting the defect, and determining the information includes classifying the detected defect based on the global texture characteristic, the one or more local characteristics, and the additional global texture characteristic. In this manner, the global texture characteristic of the image, which may be a test image or a defect image, (and its local characteristic(s)) can be augmented by a global texture characteristic of another image such as a reference image, which may be subtracted from the test image to detect the defect. The additional global texture characteristic can be input to the ML model with the other characteristics in multiple channels of input, as shown in FIG. 3, but with another channel (not shown) for the additional global texture characteristic.

The reference image in the use cases described herein will most likely be an image generated in a die on the specimen other than the die in which the test image was generated. The reference image may however be a different type of reference image such as a reference image generated from a design database for the specimen, a reference image generated from a different specimen having the same design as the specimen, a reference image generated from images of multiple dies formed on the specimen, etc.

The dies may be any suitable dies formed on the specimen, and although the test and reference images may most commonly be generated in different dies in the inspection applications for which the embodiments described herein are used, the test and reference images may be generated in any other repeating patterned areas formed on the specimen such as fields, areas within the dies or fields, or portions of the dies or fields, etc.

Differences in light levels and properties are better captured by global texture features such as autocorrelation as compared to PCA and other traditional feature detection techniques, so augmenting detection of larger, clearer features with global information of textures would capture defect detection and/or metrology signals which otherwise might be lost. The larger, clearer features are augmented with the global information simply by inputting both information into the ML model in parallel (i.e., in multiple channels of input as described further herein). More sophisticated combinations of the global texture and local characteristics may of course be possible, but may not be necessary because the relatively simple method of augmentation via multiple channels of input already provides such significant benefits for the use cases for which the embodiments described herein are intended. Furthermore, use of textures relative to each die may improve existing techniques to separate signal and noise and improve comparisons where there is a systematic difference in, e.g., light levels between multiple otherwise comparable dies. While this technique may be broadly applicable to other image classification problems, it is particularly relevant to the use cases described herein based on the introduction of global patterns due to tool state, light levels, die position on wafer, etc., which introduce texture effects at a much greater scale than the localized features considered by existing algorithms such as those that use PCA for feature detection. Some currently used inspection and metrology tools instead use handselected features that have been refined over decades, but which still focus on localized features rather than global textures. Both approaches could benefit from the additional consideration of global texture to supplement current separation of image information into localized signal and localized noise.

In one such embodiment, the classifying is performed during inspection of the specimen to determine if the detected defect is an actual defect or a background or baseline difference between the image and the additional image. For example, based on current approaches to localized feature generation and image smoothing techniques used for defect classification, the global texture inclusion techniques described herein can improve sensitivity of inspection. Using textures to explicitly separate background and baseline differences between dies (or more granular care areas) can reduce nuisance differences without lossy normalization, therefore enabling wider defect detection thresholds. By making baseline comparisons for die-to-die or database-to-die more individualized per die, this approach hypothetically helps elevate the signal for subtle defects above the anomaly detection thresholds.

In some such embodiments, the image is not normalized to the additional image prior to being used for detecting the defect. For example, as described above, the embodiments described herein can reduce nuisance differences without lossy normalization of one image to another prior to use for defect detection. There are also several currently used algorithmic approaches for smoothing out texture information. For example, die-to-die comparisons are often against an averaged reference die rather than individual adjacent dies. However, rather than discard the texture data implicit in the dies by comparing them to a normalized baseline, explicitly considering it may lead to stronger, more sensitive results. Separating out lighting differences between dies, for example, leaves the remaining signal more similar between dies than using a smoothing technique such as averaging.

As described above, in one embodiment, the image is generated by an imaging subsystem configured for metrology of the specimen. In one such embodiment, determining the information includes determining one or more characteristics of a specimen structure in the image based on the global texture characteristic and the one or more local characteristics. For example, the ML model described herein may be trained with images labeled with metrology information. The metrology information may include any metrology information of interest, which may vary depending on the structures on the specimen. Examples of such metrology information include, but are not limited to, critical dimensions (CDs) such as line width and other dimensions of the specimen structures. Once the ML model has been trained with suitably labeled specimen images, that ML model can be used to predict metrology information from unlabeled (test) specimen images. The unlabeled specimen images may include any images generated by any metrology tool, which may have a configuration such as that described herein or any other suitable configuration known in the art. In this manner, the embodiments described herein may advantageously use global texture information in combination with local characteristic(s) of a specimen image generated by a metrology tool for predicting metrology information for the specimen and any one or more specimen structures included in the input image.

In another embodiment, the computer subsystem is configured for determining an additional global texture characteristic of an additional image used with the image for performing metrology of the specimen, and determining the information includes determining one or more characteristics of a specimen structure in the image based on the global texture characteristic, the one or more local characteristics, and the additional global texture characteristic. For example, some metrology processes determine relative characteristic(s) of a specimen structure, e.g., the dimensions of one specimen structure relative to the dimensions of the same specimen structure in an adjacent field, die, region, etc., rather than determining absolute values of the characteristic(s). In this manner, metrology may be performed with more than one image of the specimen. In such embodiments, the computer subsystem may determine the global texture characteristics of both (or all) of the images being used for metrology, along with the local characteristic(s) of at least the test image but possibly also the local characteristic(s) of the other image(s), which may all then be input to the ML model by the computer subsystem. The ML model may have been trained as described herein to predict relative characteristics of a specimen structure in the test image using all of the input characteristics, global and local. In this manner, depending on what type of metrology is being performed by the embodiments described herein, an ML model may be trained using whatever images and characteristics are useful for that metrology and then the images and/or characteristics of one or more images of the specimen may be input to the ML model for the metrology predictions.

In one such embodiment, determining the one or more characteristics of the specimen structure is performed during the metrology of the specimen to determine if the specimen structure is an actual defect or if the one or more characteristics of the specimen structure are a background or baseline difference between the image and the additional image. For example, in much the same way that the ML model can be used to separate detected defects into actual defects and background or baseline differences, the ML model can be configured and used to separate specimen structures being measured for metrology into those that are actually defective and those that they have one or more predicted characteristics that are different from expected in merely a background or baseline way.

In particular, although metrology is not necessarily performed to detect defects in the same way that inspection is, the metrology results produced by a given metrology process may indicate that a specimen structure is defective, e.g., that one or more of its characteristics measured in the metrology process are outside of acceptable values for those characteristic(s). In this manner, the results of a metrology process may indicate that one or more specimen structures are defective. When the metrology process is performed using images of more than one of the specimen structures (as in the relative measurements described above), it may be difficult to determine if the differences between the images for the different specimen structures are attributable to differences between the specimen structures themselves or just differences between the images of the specimen structures (e.g., because images of the same specimen structure generated at different locations on the specimen can be different even if the specimen structures are the same). By taking the global texture characteristics of each image into consideration (by suitable global texture characteristics input during training and then runtime), the ML model can be better trained to separate image differences from specimen structure differences.

In some such embodiments, the image is not normalized to the additional image prior to being used for performing the metrology. For example, one way to separate image differences from specimen structure differences is to normalize a test image to its corresponding reference image. Therefore, the normalization can reduce and possibly even eliminate any image differences that are not due to specimen structure differences. The embodiments described herein can however eliminate the need for any such normalization because by taking the global texture characteristics of multiple images into consideration, the ML model can be trained and used to differentiate between image differences due to specimen structure differences and other image differences. Eliminating such normalization or other image modification in metrology has the same benefits described above for inspection, e.g., mitigating the loss of useful image features for metrology purposes.

Although the embodiments described herein may be used for either inspection or metrology, it is important to note that the inspection and metrology processes and results generated thereby are not necessarily interchangeable. Some important differences between inspection and metrology processes are described in the background section included herein. In addition, in terms of the mathematics of metrology, the embodiments described herein may use global texture based features for a regression problem (prediction of values) instead of a classification problem (prediction of categories—like predicting defect class of a detected defect). While global texture based features can be used for both regression and classification problems, metrology would use the global texture for regression problems while inspection would use it for a classification problem. Metrology and inspection use cases tend to be associated with regression and classification fields in ML, respectively (although not exclusively).

The key difference is that while inspection systems seek to identify outliers and classify them as a particular type of outlier (like an electrical open or an electrical short), metrology systems ignore the outliers and try to measure the averages (e.g., the average width of a line when looking at 1000 lines laid out next to each other). Therefore, depending on which application the embodiments described herein are configured for, the ML model may be trained with appropriate inputs and outputs, and in any case, the training may otherwise be performed as described herein.

The computer subsystem is also configured for generating results that include the determined information, which may include any of the results or information described herein. The results of determining the information may be generated by the computer subsystem in any suitable manner. All of the embodiments described herein may be configured for storing results of one or more steps of the embodiments in a computer-readable storage medium. The results may include any of the results described herein and may be stored in any manner known in the art. The results that include the determined information may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem described herein may include information for any defects detected on the specimen such as location, etc., of the bounding boxes of the detected defects, detection scores, information about defect classifications such as class labels or IDs, any defect attributes determined from any of the images, etc., predicted specimen structure measurements, dimensions, shapes, etc. or any such suitable information known in the art. That information may be used by the computer subsystem or another system or method for performing additional functions for the specimen and/or the detected defects such as sampling the defects for defect review or other analysis, determining a root cause of the defects, etc.

In addition to the functions described above, such functions include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the determined information. The changes to the process may include any suitable changes to one or more parameters of the process. In one such example, the computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein can allow inspection processes and tools to detect defects with increased sensitivity due to the improved defect classification enabled by the embodiments described herein. This increased sensitivity to defects allows users to improve their ability to make correct processing decisions.

The embodiments described herein have a number of advantages in addition to those already described. For example, the embodiments described herein improve the performance (described by test and validation accuracy) of neural networks on datasets that include global textured patterns in addition to localized features, e.g., represented by PCA. Improved classification of images has huge importance to the major technological hurdles of the era, including the development of autonomous vehicles, improved image searching, and process control solutions such as those used in the semiconductor industry. The emphasis on PCs and other localized features ignores vital signal coming from global texture features, the incorporation of which could improve detection of yield reducing defects by providing greater insights into the baseline state of a die or care area. While existing classification technology may include complex algorithms to separate signal from noise, it currently neglects the texture features that underly and surround the localized features. Explicitly considering global textures can provide a more customized, precise solution to individually inspect a die, augmenting the use of averaged reference images and standard reference die (SRD) images used as the baseline appearance of a working die against which anomalies are detected. By reapplying the distilled global texture features as inputs into the classification model, the embodiments described herein restore otherwise lost signal in order to improve classification in cases where textured information can distinguish hard edge cases.

Each of the embodiments described above may be combined together into one single embodiment. In other words, unless otherwise noted herein, none of the embodiments are mutually exclusive of any other embodiments.

Another embodiment relates to a computer-implemented method for determining information for a specimen. The computer-implemented method includes determining a global texture characteristic of an image of a specimen and one or more local characteristics of a localized area in the image, which may be performed according to any of the embodiments described herein. The method also includes determining information for the specimen by inputting the global texture characteristic and the one or more local characteristics into an ML model included in one or more components executed by a computer subsystem, which may be performed according to any of the embodiments described herein. In addition, the method includes generating results that include the determined information, which may also be performed as described further herein. The steps are performed by a computer subsystem, which may be configured according to any of the embodiments described herein.

Each of the steps of the method may be performed as described further herein. The method may also include any other step(s) that can be performed by the imaging subsystem and/or computer subsystem described herein. In addition, the method described above may be performed by any of the system embodiments described herein.

Figure 4:
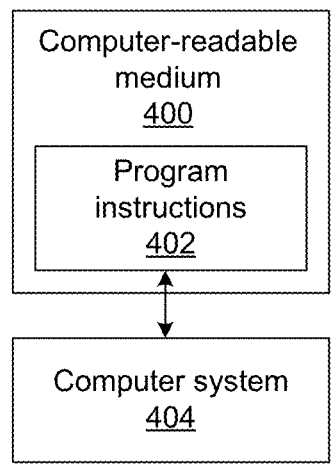
FIG. 4 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 4. In particular, as shown in FIG. 4, non-transitory computer-readable medium 400 includes program instructions 402 executable on computer system 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), Python, Tensorflow, or other technologies or methodologies, as desired.

Computer system 404 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine information for a specimen, comprising:
a computer subsystem configured for determining a global texture characteristic of an image of a specimen and one or more local characteristics of a localized area in the image; and
one or more components executed by the computer subsystem, wherein the one or more components comprise a machine learning model configured for determining information for the specimen based on the global texture characteristic and the one or more local characteristics; and
wherein the computer subsystem is further configured for generating results comprising the determined information.

2. The system of claim 1, wherein determining the global texture characteristic comprises computing an autocorrelative texture of the image.

3. The system of claim 1, wherein determining the global texture characteristic comprises computing an autocorrelative texture of the image using a Gram Matrix, flattening the autocorrelative texture, and reducing the dimensionality of the flattened autocorrelative texture by Principal Component Analysis (PCA).

4. The system of claim 1, wherein the global texture characteristic comprises marginal constraints, magnitude correlation constraints, or cross-scale phase constraints.

5. The system of claim 1, wherein the machine learning model comprises a multi-layered perceptron (MLP).

6. The system of claim 1, wherein the machine learning model comprises a multi-layered perceptron (MLP) that comprises only two hidden layers.

7. The system of claim 1, wherein the machine learning model comprises a multi-layered perceptron (MLP) that comprises only first and second hidden layers, and wherein the first hidden layer comprises about four times as many nodes as the second hidden layer.

8. The system of claim 1, wherein the machine learning model comprises a convolutional neural network.

9. The system of claim 1, wherein determining the one or more local characteristics of the localized area in the image comprises Principal Component Analysis (PCA) of the image.

10. The system of claim 1, wherein the one or more local characteristics of the localized area in the image comprise user-selected features determined from the localized area of the image.

11. The system of claim 1, wherein a defect is detected in the image, and wherein determining the information comprises classifying the detected defect.

12. The system of claim 1, wherein a defect is detected in the image, and wherein the one or more local characteristics comprise user-selected features determined from the image, an additional image used with the image for detecting the defect, a further image generated from the image and the additional image by a method that detected the defect, or a combination thereof.

13. The system of claim 1, wherein a defect is detected in the image, wherein the computer subsystem is further configured for determining an additional global texture characteristic of an additional image used with the image for detecting the defect, and wherein determining the information comprises classifying the detected defect based on the global texture characteristic, the one or more local characteristics, and the additional global texture characteristic.

14. The system of claim 13, wherein said classifying is performed during inspection of the specimen to determine if the detected defect is an actual defect or a background or baseline difference between the image and the additional image.

15. The system of claim 14, wherein the image is not normalized to the additional image prior to being used for detecting the defect.

16. The system of claim 1, wherein the computer subsystem is further configured for supervised training of the machine learning model using labeled images of the specimen or another specimen of a same type as the specimen.

17. The system of claim 1, wherein a defect is detected in the image, wherein determining the information comprises classifying the detected defect, and wherein classifying the detected defect comprises determining if a portion of the image corresponding to the detected defect is a localized defect signal or localized noise.

18. The system of claim 1, wherein the image is generated by an imaging subsystem configured for inspection of the specimen.

19. The system of claim 1, wherein determining the information comprises determining one or more characteristics of a specimen structure in the image based on the global texture characteristic and the one or more local characteristics.

20. The system of claim 1, wherein the computer subsystem is further configured for determining an additional global texture characteristic of an additional image used with the image for performing metrology of the specimen, and wherein determining the information comprises determining one or more characteristics of a specimen structure in the image based on the global texture characteristic, the one or more local characteristics, and the additional global texture characteristic.

21. The system of claim 20, wherein determining the one or more characteristics of the specimen structure is performed during the metrology of the specimen to determine if the specimen structure is an actual defect or if the one or more characteristics of the specimen structure are a background or baseline difference between the image and the additional image.

22. The system of claim 21, wherein the image is not normalized to the additional image prior to being used for performing the metrology.

23. The system of claim 1, wherein the image is generated by an imaging subsystem configured for metrology of the specimen.

24. The system of claim 1, wherein the image is generated by an imaging subsystem configured to generate the image using light.

25. The system of claim 1, wherein the image is a low resolution image.

26. A non-transitory computer-readable medium, storing program instructions executable on a computer system for performing a computer-implemented method for determining information for a specimen, wherein the computer-implemented method comprises:
 determining a global texture characteristic of an image of a specimen and one or more local characteristics of a localized area in the image;
 determining information for the specimen by inputting the global texture characteristic and the one or more local characteristics into a machine learning model included in one or more components executed by the computer system; and
 generating results comprising the determined information.

27. A computer-implemented method for determining information for a specimen, comprising:
 determining a global texture characteristic of an image of a specimen and one or more local characteristics of a localized area in the image;
 determining information for the specimen by inputting the global texture characteristic and the one or more local characteristics into a machine learning model included in one or more components executed by a computer subsystem; and
 generating results comprising the determined information, wherein said determining the global texture characteristic and the one or more local characteristics, inputting, and generating are performed by the computer subsystem.

* * * * *